United States Patent
Fox et al.

(10) Patent No.: US 8,951,446 B2
(45) Date of Patent: Feb. 10, 2015

(54) HYBRID PARTICLES AND ASSOCIATED METHODS

(75) Inventors: Robert V. Fox, Idaho Falls, ID (US);
Rene Rodriguez, Pocatello, ID (US);
Joshua J. Pak, Pocatello, ID (US);
Chivin Sun, Staten Island, NY (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 304 days.

(21) Appl. No.: 13/365,800

(22) Filed: Feb. 3, 2012

(65) Prior Publication Data
US 2013/0200313 A1 Aug. 8, 2013

(51) Int. Cl.
*H01B 1/02* (2006.01)

(52) U.S. Cl.
USPC ....... 252/519.14; 252/514; 427/157; 136/252

(58) Field of Classification Search
CPC .................... H01L 31/0322; H01L 21/00
USPC ............... 252/514, 519.14; 427/157; 136/252
See application file for complete search history.

(56) References Cited

U.S. PATENT DOCUMENTS

| | | | |
|---|---|---|---|
| 4,155,781 A | 5/1979 | Diepers | |
| 4,687,881 A | 8/1987 | Goslowsky et al. | |
| 4,906,290 A | 3/1990 | Worner | |
| 5,445,847 A | 8/1995 | Wada et al. | |
| 5,501,786 A | 3/1996 | Gremion et al. | |
| 5,567,469 A | 10/1996 | Wada et al. | |
| 5,858,120 A | 1/1999 | Nakagawa et al. | |
| 6,127,202 A | 10/2000 | Kapur et al. | |
| 6,145,342 A | 11/2000 | Bayya et al. | |
| 6,284,314 B1 | 9/2001 | Kato et al. | |
| 6,307,148 B1 | 10/2001 | Takeuchi et al. | |
| 6,355,874 B1 | 3/2002 | Yagi et al. | |
| 6,429,369 B1 | 8/2002 | Tober et al. | |
| 6,592,938 B1 | 7/2003 | Pessey et al. | |
| 6,875,661 B2 | 4/2005 | Mitzi | |
| 6,992,201 B2 | 1/2006 | Scholz et al. | |
| 6,992,202 B1 | 1/2006 | Banger et al. | |
| 7,068,898 B2 | 6/2006 | Buretea et al. | |
| 7,265,037 B2 | 9/2007 | Yang et al. | |
| 7,351,282 B2 | 4/2008 | Yamaguchi | |
| 7,466,376 B2 | 12/2008 | Galvin et al. | |
| 7,545,051 B2 | 6/2009 | Yang et al. | |
| 7,575,699 B2 | 8/2009 | Strouse et al. | |

(Continued)

FOREIGN PATENT DOCUMENTS

| | | | | |
|---|---|---|---|---|
| GB | 2472541 B | | 3/2011 | |
| WO | WO 2010-052221 | * | 5/2010 | ............... B01J 13/02 |

OTHER PUBLICATIONS

Bahnemann, D. W., "Ultrasmall Metal Oxide Particles: Preparation, Photophysical Characterization, and Photocatalytic Properties". Israel J. Chem., 1993, pp. 115-136, vol. 33.

(Continued)

*Primary Examiner* — Khanh Tuan Nguyen
(74) *Attorney, Agent, or Firm* — TraskBritt (57) ABSTRACT

Hybrid particles that comprise a coating surrounding a chalcopyrite material, the coating comprising a metal, a semiconductive material, or a polymer; a core comprising a chalcopyrite material and a shell comprising a functionalized chalcopyrite material, the shell enveloping the core; or a reaction product of a chalcopyrite material and at least one of a reagent, heat, and radiation. Methods of forming the hybrid particles are also disclosed.

19 Claims, 1 Drawing Sheet

(56) References Cited

U.S. PATENT DOCUMENTS

| | | | |
|---|---|---|---|
| 7,615,169 B2 | 11/2009 | Strouse et al. | |
| 7,883,799 B2 | 2/2011 | Seo et al. | |
| 7,892,519 B2 | 2/2011 | Pak et al. | |
| 2002/0005145 A1 | 1/2002 | Sherman | |
| 2002/0071970 A1 | 6/2002 | Elder et al. | |
| 2003/0226498 A1 | 12/2003 | Alivisatos et al. | |
| 2004/0031519 A1 | 2/2004 | Andriessen | |
| 2004/0095658 A1 | 5/2004 | Buretea et al. | |
| 2004/0120884 A1 | 6/2004 | Sherman | |
| 2004/0126485 A1 | 7/2004 | Thompson et al. | |
| 2004/0131934 A1 | 7/2004 | Sugnaux et al. | |
| 2004/0256001 A1 | 12/2004 | Mitra et al. | |
| 2005/0016577 A1 | 1/2005 | Andriessen et al. | |
| 2005/0133087 A1 | 6/2005 | Alivisatos et al. | |
| 2005/0183767 A1 | 8/2005 | Yu et al. | |
| 2005/0267345 A1 | 12/2005 | Korgel et al. | |
| 2005/0271827 A1 | 12/2005 | Krunks et al. | |
| 2006/0110314 A1 | 5/2006 | Torardi | |
| 2006/0110315 A1 | 5/2006 | Torardi | |
| 2006/0110316 A1 | 5/2006 | Torardi | |
| 2006/0110317 A1 | 5/2006 | Torardi | |
| 2006/0110318 A1 | 5/2006 | Torardi | |
| 2006/0144793 A1 | 7/2006 | Dadachov | |
| 2006/0159611 A1 | 7/2006 | Hummelen et al. | |
| 2006/0216610 A1 | 9/2006 | Galvin et al. | |
| 2006/0249373 A1 | 11/2006 | Vanderstraeten | |
| 2006/0263291 A1 | 11/2006 | Torardi | |
| 2007/0000537 A1 | 1/2007 | Leidholm et al. | |
| 2007/0025139 A1 | 2/2007 | Parsons | |
| 2007/0102040 A1 | 5/2007 | Beckenbaugh et al. | |
| 2007/0128350 A1* | 6/2007 | Nakamura et al. | 427/157 |
| 2007/0204904 A1 | 9/2007 | Brooks et al. | |
| 2007/0209700 A1 | 9/2007 | Yonezawa et al. | |
| 2007/0277871 A1 | 12/2007 | Lee et al. | |
| 2007/0295385 A1 | 12/2007 | Sheats et al. | |
| 2008/0006322 A1 | 1/2008 | Wang et al. | |
| 2008/0006324 A1 | 1/2008 | Berke et al. | |
| 2008/0012015 A1 | 1/2008 | Shim et al. | |
| 2008/0023677 A1 | 1/2008 | Frechet et al. | |
| 2008/0026929 A1 | 1/2008 | Jensen et al. | |
| 2008/0031832 A1 | 2/2008 | Wakefield et al. | |
| 2008/0041447 A1 | 2/2008 | Tseng et al. | |
| 2008/0110494 A1 | 5/2008 | Reddy | |
| 2008/0142075 A1 | 6/2008 | Reddy et al. | |
| 2008/0149171 A1 | 6/2008 | Lu et al. | |
| 2008/0156371 A1 | 7/2008 | LoCascio et al. | |
| 2008/0207581 A1 | 8/2008 | Whiteford et al. | |
| 2008/0230120 A1 | 9/2008 | Reddy | |
| 2008/0289681 A1 | 11/2008 | Adriani et al. | |
| 2008/0289682 A1 | 11/2008 | Adriani et al. | |
| 2008/0308148 A1 | 12/2008 | Leidholm et al. | |
| 2009/0050207 A1 | 2/2009 | Galvin et al. | |
| 2009/0133751 A1 | 5/2009 | Sreenivasan et al. | |
| 2009/0173371 A1 | 7/2009 | Skoczenski et al. | |
| 2009/0233398 A1 | 9/2009 | Fox et al. | |
| 2011/0027572 A1 | 2/2011 | Wiesner | |
| 2011/0152554 A1 | 6/2011 | Fox et al. | |
| 2011/0204320 A1 | 8/2011 | Fox et al. | |
| 2012/0061627 A1* | 3/2012 | Reiss et al. | 252/519.14 |
| 2012/0108418 A1 | 5/2012 | Nair et al. | |
| 2012/0192930 A1* | 8/2012 | Fox et al. | 136/252 |

OTHER PUBLICATIONS

Bamba et al., "TiO2—ZnO Porous Films Formed by ZnO Dissolution," AZojomo, vol. 3, Dec. 2007, 7 pages.

Banger et al., "A review of single source precursors for the deposition of ternary chalcopyrite materials," NASA Conference Publication (2002), 17th Space Photovoltaic Research and Technology Conference, 2001, pp. 115-125.

Banger et al., "Ternary single-source precursors for polycrystalline thin-film solar cells," Appl. Organomet. Chem. (2002) 16:617-627.

Banger, K.K., et al., "A New Facile Route for the Preparation of Single-Source Precursors for Bulk, Thin-Film, and Nanocrystallite I-III-VI Semiconductors," Inorg. Chem., 2003, pp. 7713-7715, vol. 42, No. 24.

Banger, K.K., et al., "Facile modulation of single source precursors: the synthesis and characterization of single source precursors for deposition of ternary chalcopyrite materials," Thin Solid Films, 2002, pp. 390-395, vol. 403-404.

Banger, K.K., et al., "Synthesis and Characterization of the First Liquid Single-Source Precursors for the Deposition of Ternary Chalcopyrite (CuInS(2)) Thin Film Materials," Chem. Mater., 2001, pp. 3827-3829, vol. 13.

Cardellicchio, N., et al., "Optimization of Microwave Digestion for Mercury Determination in Marine Biological Samples by Cold Vapour Atomic Absorption Spectrometry", Annali di Chimica, 2006, pp. 159-165, vol. 96 (3-4).

Carro, N., et al., "Microwave-assisted solvent extraction and gas chromatography ion trap mass spectrometry procedure for the determination of persistent organochlorine pesticides (POPs) in marine sediment", Anal. Bioanal. Chem., 2006, pp. 901-909, vol. 385.

Castro, S.L., et al., "Synthesis and Characterization of Colloidal CuInS(2) Nanoparticles from a Molecular Single-Source Precursor," J Phys Chem B., 2004, pp. 12429-12435, vol. 108.

Castro, S.L., et al., "Nanocrystalline Chalcopyrite Materials (CuInS(2)), and CuInSe(2)) via Low-Temperature Pyrolysis of Molecular Single-Source Precursors", Chem. Mater., 2003, pp. 3142-3147, vol. 15.

Choi, S.H., et al., "One-Pot Synthesis of Copper—Indium, Sulfide Nanocrystal Heterostructures with Acorn, Bottle, and Larva Shapes," J. Am Chem Soc., 2006, pp. 2520-2521, vol. 128 (8).

Connor et al., "Phase Transformation of Biphasic CuS#CuInS to Monophasic CuInS Nanorods," J. Am. Chem. Soc, 2009, 131 (13), 4962-4966.

De Faria, et al., "Sol-Gel TiO2 Thin Films Sensitized with the Mulberry Pigment Cyanidin," Materials Research, vol. 10, No. 4, 413-417, 2007.

Deivaraj et al., "Novel bimetallic thiocarboxylate compounds as single-source precursors to binary and ternary metal sulfide materials," Chem. Mater. (2003) 15:2383-2391.

Deivaraj et al., "Single-source precursors to ternary silver indium sulfide materials," Chem. Commun. (2001) 2304-2305.

Deniozou et al., "Surface structure of CuGASe2 (001)" Thin Solid Films 480-481 (2005) 382-387.

Domini, C.E., et al., "Comparison of three optimized digestion methods for rapid determination of chemical oxygen demand: Closed microwaves, open microwaves and ultrasound irradiation," Analytica Chimica Acta., 2006, pp. 210-217, vol. 561.

Dutta, D.P., et al., "A facile route to the synthesis of CuInS(2) nanoparticles," Materials Letters, 2006, pp. 2395-2398, vol. 60.

Gamallo-Lorenzo, D., et al., "Microwave-assisted alkaline digestion combined with microwave-assisted distillation for the determination of iodide and total iodine in edible seaweed by catalytic spectrophotometry," Analytica Chimica Acta., 2005, pp. 287-295, vol. 542.

Garcia-Vidal, J.A., et al., "Green chemistry: Efficient epoxides ring-opening with I-butanol under microwave irradiation," Applied Surface Science, 2006, pp. 6064-6066, vol. 252 (17).

Gardner et al., "Rapid synthesis and size control of CuInS2 semiconductor nanoparticles using microwave irradiation," J. Nanoparticle Research 2008, 10(4), pp. 633-641.

Gerbec, J.A., et al., "Microwave-Enhanced Reaction Rates for Nanoparticle Synthesis," J. Am. Chem. Soc., 2005, pp. 15791-15800, vol. 127.

Gratzel, M., "Perspectives for Dye-sensitized Nanocrystalline Solar Cells," Progress in Photovoltaics: Research and Applications, 2000, pp. 171-185, vol. 8.

Grisaru, H, et al., "Microwave-Assisted Polyol Synthesis of CuInTe(2) and CuInSe(2) Nanoparticles," Inorg. Chem., 2003, pp. 7148-7155, vol. 42.

Halgand et al., "Physico-chemical characterisation of Cu(In,Al)Se2 thin film for solar cells obtained by a selenisation process," Thin Solid Films 480-481 (2005) 443-446.

Hamid et al., "Preparation of Titanium Dioxide (TiO2) thin films by sol gel dip coating method," Malaysian Journal of Chemistry, 2003, vol. 5, No. 1, pp. 086-091.

(56) References Cited

OTHER PUBLICATIONS

Hayes, B.L., "Recent Advances in Microwave-Assisted Synthesis," Aldrichimica Acta., 2004, pp. 66-77, vol. 37 No. 2.

Hirashima et al., "Preparation of meso-porous TiO2 gels and their characterization," Journal of Non-Crystalline Solids 285 (2001) pp. 96-100.

Hirpo, Wakgari, et al., Synthesis of Mixed Copper—Indium Chalcogenolates. Single-Source Precursors for The Photovoltaic Materials CuInQ(2) (Q=S, Se), J. Am. Chem. Soc., 1993, pp. 1597-1599, vol. 115, No. 4.

Huynh, W.U., et al., "Hybrid Nanorod-Polymer Solar Cells," Science, 2002, pp. 2425-2427, vol. 295.

Huynh, W.U., et al., "CdSe Nanocrystal Rods/Poly (3-hexylthiophene) Composite Photovoltaic Devices," Advanced Materials, 1999, pp. 923-927, vol. 11 No. 11.

Jin et al., "Solar cells fabricated with CuInS2 films deposited using single-source precursors," Proceedings of the 19th European Photovoltaic Solar Energy Conference, 4AV.1.71, 2004.

Kim, K., et al., "Synthesis of CuInSe(2) and CuInGaSe(2) Nanoparticles by Solvothermal Route," Materials Science Forum, 2004, pp. 273-276, vol. 449-452.

Liu et al., "Preparation and characterization of CuInS2 thin films completely converted from CuInSe2 by sulfurization," Thin Solid Films 480-481 (2005) 50-54.

Luque, A., et al., "Increasing the Efficiency of Ideal Solar Cells by Photon Induced Transitions at Intermediate Levels," Physical Review Letters, 1997, pp. 5014-5017, vol. 78 No. 26.

Malik et al., "A novel route for the preparation of CuSe and CuInSe2 nanoparticles," Advanced Materials, (1999) 11:1441-1444.

Marcinkevicius, S., et al., "Changes in carrier dynamics induced by proton irradiation in quantum dots," Physica. B, Condensed Matter, 2002, pp. 203-206, vol. 314.

Miki et al., "Influence of calcination temperature on the microstructure of pourous TiO2 film," Materials Science Forum, vol. 569 (2008) pp. 17-20.

Murali, A., et al., Synthesis and Characterization of Indium Oxide Nanoparticles, Nano Letters, 2001, pp. 287-289, vol. 1, No. 6.

Nairn et al., "Preparation of Ultrafine Chalcopyrite Nanoparticles via the Photochemical Decomposition of Molecular Single-Source Precursors," Nano Letters 2006, vol. 6(6), pp. 1218-1223.

Narako et al., "Synthesis of Metastable Wurtzite CuInSe2Nanocrystals," Chem. Mater. 2010, 22, 1613-1615.

Navarro, P., et al., "Optimisation of microwave assisted digestion of sediments and determination of Sn and Hg," Analytica Chimica Acta, 2006, pp. 37-44, vol. 566.

Nüchter, M., et al., "Microwave Assisted Synthesis—a critical technology overview," Green Chem., 2004, pp. 128-141, vol. 6 (3).

Nüchter, M., et al., "Microwave-Assisted Chemical Reactions," Chem. Eng. Technol., 2003, 1207-1216, vol. 26 (12).

Paez et al., "Properties of Sol-Gel TiO2 Layers on Glass Substrate," Ceramics—Silikáty 48 (2) pp. 66-71 (2004).

Pak, J.J., et al., "An efficient synthesis of 4, 4',5,5'-tetraiododibenzo-24-crown-8 and its highly conjugated derivatives," Tetrahedron Letters, 2006, pp. 233-237, vol. 47.

Pan et al., "Synthesis of Cu-In-S Ternary Nanocrystals with Tunable Structure and Composition," J. Am. Chem. Soc. Apr. 30, 2008; 130(17):5620-1, Epub Apr. 9, 2008.

PCT International Preliminary Report on Patentability for International Searching Authority for PCT/US09/36221, dated Sep. 14, 2010, 8 pages.

PCT International Search Report and Written Opinion of the International Searching Authority for PCT/US09/36221, dated Nov. 2, 2009, 11 pages.

PCT International Search Report and Written Opinion of the International Searching Authority for PCT/US10/60583, dated Mar. 21, 2011, 12 pages.

Perozo-Rondon, E., et al., "Microwave enhanced synthesis of N-propargyl derivatives of imidazole A green approach for the preparation of fungicidal compounds," Applied Surface Science, 2006, pp. 6067-6070, vol. 252 (17).

Qi et al., "Synthesis and Characterization of Nanostructured Wurtzite CuInS2: A New Cation Disordered Polymorph of CuInS2," J. Phys. Chem. C 2009, 113, 3939-3944.

Rodrigues, et al., "Pulsed-Spray Radiofrequency Plasma Enhanced Chemical Vapor Deposition of CUInS2 Thin Films," Plasma Chemistry and Plasma Processing, vol. 26, No. 2, Apr. 2006, pp. 137-148.

Rodriguez et al., "The Formation of Copper Indium Disulfide Nano-Particles in Supercritical Carbon Dioxide," NORM 2007, American Chemical Society, The 62nd Northwest Regional Meeting, Boise, Idaho, Jun. 17-20, 2007, 5 pages.

Sayilkan et al., "Characterization of TiO2 Synthesized in Alcohol by a Sol-Gel Process: The Effects of Annealing Temperature and Acid Catalyst," Turk J Chem, 29 (2005) pp. 697-706.

Sobolev, N.A., et al., "Enhanced Radiation Hardness of InAs/GaAs quantum Dot Structures," Phys. Stat. Sol. (B), 2001, pp. 93 -96, vol. 224, No. 1.

Sun et al., "A High-Yield Synthesis of Chalcopyrite CuInS2 Nanoparticles with Exceptional Size Control," Journal of Nanomaterials, vol. 2009, Article ID 748567, 7 pages.

Tang, Z., et al., "Semiconductor Nanoparticles on Solid Substrates: Film Structure, Intermolecular Interactions, and Polyelectrolyte Effects," Langmuir, 2002, pp. 7035-7740, vol. 18.

Tomalia, D.A., "Birth of a New Macromolecular Architecture: Dendrimers as Quantized Building Blocks for Nanoscale Synthetic Organic Chemistry," Aldrichimica ACTA, 2004, pp. 39-57, vol. 27, No. 2.

Vittal et al., "Chemistry of metal thio- and selenocarboxylates: precursors for metal sulfide/selenide materials, thin films, and nanocrystals," Acc. Chem. Res. (2006) 39:869-877.

Walters, R.J., et al., "Radiation Hard Multi-quantum Well InP/InAsP Solar Cells for Space Applications," Progress in Photovoltaics: Research and Applications, 2000, pp. 349-354, vol. 8.

Wang et al., "Synthesis of Monodispersed Wurtzite Structure CuInSe2 Nanocrystals and Their Application in High-Performance Organic-Inorganic Hybrid Photodetectors," J. Am. Chem. Soc., 2010, 132 (35), pp. 12218-12221.

Wang, Y., et al., "Nanometer-Sized Semiconductor Clusters: Materials Synthesis, Quantum Size Effects, and Photophysical Properties," J. Phys. Chem., 1991, pp. 525-532, vol. 95.

Wei, Q., et al., "Synthesis of CuInS(2) Nanocubes by a Wet Chemical Process," Journal of Dispersion Science and Technology, 2005, pp. 555-558, vol. 26.

Zhang, X., et al., "Applications of microwave dielectric heating in environment-related heterogeneous gas-phase catalytic systems," Inorganica Chimica Acta, 2006, pp. 3421-3433, vol. 359.

Zhu, J., et al., "Microwave assisted preparation of CdSe, PbSe, andCU2-x Se nanoparticles," J. Phys. Chem. B., 2000, 104 (31), 7344-7347.

Li et al., "Solution Synthesis of High-Quality CuInS2 Quantum Dots as Sensitizers for TiO2 Photoelectrodes", Journal of Materials Chemistry, Mar. 2010, pp. 3656-3664.

\* cited by examiner

HYBRID PARTICLES AND ASSOCIATED METHODS

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

CROSS-REFERENCE TO RELATED APPLICATIONS

This application is related to U.S. patent application Ser. No. 12/047,956, filed Mar. 13, 2008, now U.S. Pat. No. 8,003,070, and entitled "Methods for Forming Particles from Single Source Precursors, Methods of Forming Semiconductor Devices, and Devices Formed Using Such Methods," U.S. patent application Ser. No. 12/646,474, now U.S. Pat. No. 8,324,414, issued Dec. 4, 2012, and entitled "Methods of Forming Single Source Precursors, Methods of Forming Polymeric Single Source Precursors, and Single Source Precursors and Intermediate Products Formed by such Methods," U.S. patent application Ser. No. 13/191,062, filed Jul. 26, 2011, and entitled "Formation of Integral Composite Photon Absorber Layer Useful for Photoactive Devices and Sensors," or U.S. patent application Ser. No. 13/019,879, filed Mar. 2, 2011, and entitled "Methods for Forming Particles, Method of Forming Semiconductor Materials, Methods of Forming Semiconductor Devices, and Devices Formed Using Such Methods," the disclosure of each of which patent or patent application is incorporated herein in its entirety by this reference.

TECHNICAL FIELD

The disclosure, in various embodiments, relates to hybrid particles and to methods of forming such hybrid particles.

BACKGROUND

Semiconductor devices are devices that utilize semiconductor materials, which are solid materials that exhibit an electrical conductivity intermediate between that of a conductor and that of an insulator. Semiconductor devices include, for example, diodes (e.g., light emitting diodes (LEDs)), photovoltaic devices, sensors, solid state lasers, and integrated circuits (e.g., memory modules and microprocessors). Photovoltaic devices are semiconductor devices that convert photons (e.g., light) into electricity. For example, solar panels include photovoltaic devices that convert sunlight (i.e., photons originating from the sun) into electricity. Due to the ever-increasing demand for renewable energy sources, the market for photovoltaic devices has experienced an average annual growth rate of about twenty-five percent (25%) over the previous decade.

Manufacturing processes for thin films of semiconductor materials include electroplating techniques, vapor deposition, flash evaporation, and evaporation from binary compounds, spray pyrolysis, and radiofrequency or ion beam sputtering of polycrystalline materials. In addition, semiconductor materials, such as chalcopyrite materials, may be formed by decomposing one or more so-called "single source precursors" (SSPs), which are organometallic substances (e.g., molecules, complexes, etc.) that include all of the atomic elements, in the appropriate stoichiometric ratios, necessary to form a chalcopyrite material.

Extensive research and development has resulted in semiconductor devices that are cheaper and more efficient. A majority of semiconductor devices that are commercially available include photodiodes formed in silicon substrates. The performance of such silicon-based photovoltaic devices, is however, inherently limited by physical and chemical properties of silicon. New photovoltaic devices have been created that are based on light-absorbing materials (which may be either organic or inorganic) other than silicon. The number of non-silicon-based photovoltaic devices has steadily increased over the previous two (2) decades and currently accounts for over ten percent (10%) of the solar energy market. Non-silicon photovoltaic devices are expected to eventually replace a large portion of the market for silicon-based photovoltaic devices and to expand the solar energy market due to their material properties and efficient power generating ability. In order for solar power to be economically competitive with alternative fossil fuel power sources at their current prices, photovoltaic devices based on photoactive materials other than silicon must be improved and further developed.

Materials other than silicon that can be employed in semiconductor devices include, for example, germanium (Ge), chalcopyrites (e.g., $CuInS_2$, $CuGaS_2$, and $CuInSe_2$), chalcogenides [$Cu(In_xGa_{1-x})(Se_yS_{1-y})_2$], cadmium telluride (CdTe), gallium arsenide (GaAs), organic polymers (e.g., polyphenylene vinylene, copper phthalocyanine, fullerenes), and light absorbing dyes (e.g., ruthenium-centered metallorganic dyes). Photovoltaic devices based on such materials demonstrate promise of being less expensive than silicon-based devices, while delivering photon conversion efficiencies comparable to those exhibited by silicon-based devices. Furthermore, some non-silicon photovoltaic devices are capable of capturing a broader range of electromagnetic radiation than silicon-based devices, and as such, may be more efficient in producing electrical power from solar energy than are silicon-based devices.

Non-silicon semiconductor devices may include thin films of semiconductor materials, which films may include polycrystalline materials or nanoparticles. The thin films of semiconductor materials may be formed on flexible substrates such as polyethylene terephthalate (such as that sold under the tradename MYLAR®), which allows for a broad range of new configurations, designs, and applications for semiconductor devices that were previously unavailable to silicon-based devices. Furthermore, thin film designs may use less than one percent (1%) of the raw materials used in conventional silicon-based devices, and therefore, may cost much less than silicon-based devices in terms of basic raw materials.

Conventional semiconductor devices, such as LEDs, include lanthanide-based materials. By way of example, the lanthanide-based materials function as the phosphor in the LEDs. However, lanthanide-based materials are expensive due to a high demand for, but limited supply of, these materials. It would be desirable to provide a lower cost alternative to lanthanide-based materials in semiconductor devices, such as LEDs.

BRIEF SUMMARY

An embodiment of the disclosure comprises a hybrid particle comprising a coating surrounding a chalcopyrite material, the coating comprising a metal, a semiconductive material, or a polymer.

Another embodiment of the disclosure comprises a hybrid particle comprising a core comprising a chalcopyrite material and a shell comprising a functionalized chalcopyrite material, the shell enveloping the core.

Yet another embodiment of the disclosure comprises a hybrid particle comprising a reaction product of a chalcopyrite material and at least one of a reagent, heat, and radiation.

Yet still another embodiment of the disclosure comprises a method of forming hybrid particles that comprises forming at least one coating on chalcopyrite particles, the chalcopyrite particles formed from a single source precursor of a chalcopyrite material.

Another embodiment of the disclosure comprises a method of forming hybrid particles that comprises functionalizing at least a surface of chalcopyrite particles, the chalcopyrite particles formed from a single source precursor of a chalcopyrite material.

DETAILED DESCRIPTION

Hybrid particles are disclosed, as are methods of making the hybrid particles. The hybrid particles are formed from chalcopyrite particles that have been produced from at least one single source precursor (SSP) or from at least one precopolymer of an SSP. As used herein, the term "hybrid particles" means and includes chalcopyrite particles that have been modified, such as physically or chemically modified. The hybrid particles differ in at least one property relative to the chalcopyrite particles. The hybrid particles are formed from the chalcopyrite particles, while the chalcopyrite particles are directly formed from the SSP. As used herein, the term "chalcopyrite" means and includes a material exhibiting a crystal lattice structure that includes a tetrahedrally coordinated, ordered structure, which is also known as a tetragonal scalenohedral system. The chalcopyrite particles may be nanoparticles of a chalcopyrite material having a particle size in the range of from approximately 0.5 nm to approximately 300 nm. In contrast to its meaning in the geological arts, the term "chalcopyrite" does not mean a material having the chemical formula $CuFeS_2$. The hybrid particles may have improved photochemical properties compared to the chalcopyrite particles. Thus, the hybrid particles may be in a more usable or useful form for use in semiconductor devices than the chalcopyrite particles.

To form the hybrid particles, additional materials are formed over the chalcopyrite particles, or the chalcopyrite particles are subjected to additional chemical acts or physical acts to functionalize at least a surface of the chalcopyrite particles. As used herein, the term "functionalize," or grammatical equivalents thereof, means and includes adding (e.g., bonding) a functional group to the chalcopyrite material of the chalcopyrite particles by a chemical reaction. The hybrid particles are physically or chemically modified forms of the chalcopyrite particles and, therefore, include additional coatings or layers compared to the chalcopyrite particles, or include at least a modified or functionalized surface in comparison to the chalcopyrite particles. The additional materials on the chalcopyrite particles or functionalized portions of the chalcopyrite particles may provide different properties to the hybrid particles than exhibited by the chalcopyrite particles. By adjusting reaction conditions for forming at least one of the chalcopyrite particles from the single source precursor and the hybrid particles from the chalcopyrite particles, the hybrid particles may be in a wurtzite phase, a chalcopyrite phase, or a combination thereof. By tailoring the hybrid particles to include a portion of particles in the wurtzite phase and a portion of particles in the chalcopyrite phase, the hybrid particles may be used to form high quality, low defect semiconductor materials.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

The chalcopyrite particles may be as described in one or more of U.S. patent application Ser. No. 12/047,956, filed Mar. 13, 2008, now U.S. Pat. No. 8,003,070, and entitled "Methods for Forming Particles from Single Source Precursors, Methods of Forming Semiconductor Devices, and Devices Formed Using Such Methods," U.S. patent application Ser. No. 12/646,474, filed Dec. 23, 2009, now U.S. Pat. No. 8,324,414, issued Dec. 4, 2012, and entitled "Methods of Forming Single Source Precursors, Methods of Forming Polymeric Single Source Precursors, and Single Source Precursors and Intermediate Products Formed by such Methods," and U.S. patent application Ser. No. 13/019,879, filed Mar. 2, 2011, and entitled "Methods of Forming Particles, Method of Forming Semiconductor Materials, Methods of Forming Semiconductor Devices, and Devices Formed Using Such Methods." The chalcopyrite particles may be formed from a chalcopyrite material, such as a ternary or quaternary chalcopyrite material. The SSPs and methods of forming the chalcopyrite particles from the SSPs are as described in one or more of the above-referenced patents or patent applications. As used herein, the term "single source precursor" means and includes any molecule or complex having all of the necessary atomic elements, in the appropriate stoichiometric ratios, necessary to form the chalcopyrite material. The chalcopyrite particles may be in a wurtzite phase, a chalcopyrite phase, or a combination thereof.

The chalcopyrite material may have the empirical formula of $I-III-VI_2$, where Roman numeral I refers to an element(s) in Group 11 (Cu, Ag, Au) of the periodic table, Roman numeral III refers to an element(s) in Group 13 (B, Al, Ga, In, Ti) of the periodic table, and Roman numeral VI refers to an element(s) in Group 16 (O, S, Se, Te, Po) of the periodic table. For example, the chalcopyrite material may have the empirical formula $CuInS_2$, $CuInSe_2$, $Cu(In,Ga)Se_2$, $CuGaSe_2$, or $AgInS_2$. The proportions of each of the elements represented by Roman numeral I, Roman numeral III, and Roman numeral VI may range from approximately 1% to approximately 99%. The chalcopyrite material may also be referred to herein as having the empirical formula $NME_2$, where N is the Group 11 element, M is the Group 13 element, and E is the Group 16 element. Each E in the chalcopyrite material ($NME_2$) may be the same or different. The chalcopyrite material may also have an empirical formula of $NME_2(R)$, where N, M, and E are as previously described and where R is an alkyl group, aryl group, vinyl group, (per)fluoro alkyl group, (per)fluoro aryl group, silane group, or carbamato group.

As used herein, the term "alkyl" means and includes a saturated, straight, branched, or cyclic hydrocarbon containing from 1 carbon atom to 8 carbon atoms. Examples include, but are not limited to, methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl.

As used herein, the term "aryl" means and includes a phenyl group, a tolyl group, or a naphthyl group or a substituted phenyl group, a substituted tolyl group, or a substituted naphthyl group, wherein the substituent is a halo, alkyl, alkoxy, alkylthio, amide, amino, alkylamino, dialkylamino, haloalkyl, hydroxyalkyl, alkoxyalkyl, methylenedioxy, carboxyl, cyano, C(O)(alkyl), —$CO_2H$, —$SO_3H$, or —$CO_2$, and wherein the aryl group may include up to four substituents.

As used herein, the term "vinyl" means and includes a derivative of ethane ($CH_2$=$CH_2$) with one hydrogen atom replaced with another atom.

As used herein, the term "(per)fluoro alkyl" means and includes an alkyl group in which each of the hydrogen atoms is substituted with fluorine.

As used herein, the term "(per)fluoro aryl" means and includes an aryl group in which each of the hydrogen atoms is substituted with fluorine.

By ternary, it is meant that the chalcopyrite material contains atoms from three elemental groups of the periodic table. For example, approximately 25% of the atoms in a ternary chalcopyrite material may be from Group 11 of the periodic table, approximately 25% of the atoms may be from Group 13 of the periodic table, and approximately 50% of the atoms may be from Group 16 of the periodic table. Ternary chalcopyrite materials also include materials having multiple and/or different atoms from each of the groups of the periodic table. For example, CuInSSe is a ternary chalcopyrite material because it has Cu (a Group 11 element), In (a Group 13 element), and S and Se (Group 16 elements). In addition, molecules of the form (Cu:Ag)(In:Ga)(S:Se), having various ratios of the respectively grouped atoms are all ternary chalcopyrite materials (Cu and Ag both are in Group 11 of the periodic table, In and Ga both are in Group 13 of the periodic table, and S and Se both are in Group 16 of the periodic table). The chalcopyrite material may additionally include atoms of at least one of carbon, hydrogen, fluorine, silicon, and nitrogen.

The chalcopyrite particles may have a narrow size distribution. Thus, the chalcopyrite particles may be substantially uniform in surface area, which affects the reactivity of the chalcopyrite particles during the conversion to the hybrid particles. By using chalcopyrite particles that have substantially similar surface areas, desired properties of the hybrid particles may be substantially homogeneous. In some embodiments, the chalcopyrite particles have an average particle size (e.g., an average diameter) of less than or equal to 800 nm. In other embodiments, the chalcopyrite particles may be nanoparticles (i.e., particles having an average diameter of less than or equal to approximately one hundred nanometers (100 nm), such as an average particle size of less than or equal to approximately 15 nm, such as approximately 5 nm).

The chalcopyrite particles, from which the hybrid particles are to be produced, may be in a wurtzite phase, a chalcopyrite phase, or a combination thereof. As used herein, the term "wurtzite phase" means and includes a state in which a material exhibits a crystal lattice structure that includes a hexagonal close packed array of anions with cations occupying half of the tetrahedral holes. The chalcopyrite material in the wurtzite phase has a hexagonal crystal structure and includes tetrahedrally coordinated metal and sulfur atoms stacked in an ABABAB pattern (e.g., a hexagonal dihexagonal pyramidal crystal structure). As used herein, the term "chalcopyrite phase" means and includes a state in which a material exhibits a crystal lattice structure that includes a tetrahedrally coordinated, ordered structure, which is also known as a tetragonal scalenohedral system.

During formation of the chalcopyrite particles, a temperature to which a reaction mixture of the SSP, a solvent, and a thiol reactant is exposed may be controlled to form a desired ratio of chalcopyrite particles in the wurtzite phase (i.e., wurtzite particles) to chalcopyrite particles in the chalcopyrite phase, as described in U.S. patent application Ser. No. 13/019,879, filed Mar. 2, 2011, and entitled "Methods for Forming Particles, Method of Forming Semiconductor Materials, Methods of Forming Semiconductor Devices, and Devices Formed Using Such Methods." The reaction mixture may be subjected to a temperature of between approximately 60° C. and approximately 360° C. to form a plurality of the chalcopyrite particles in the chalcopyrite phase. In embodiments in which the chalcopyrite particles include a mixture of chalcopyrite particles in the wurtzite phase and chalcopyrite phase, the reaction mixture may be subjected to a temperature of between approximately 120° C. and approximately 300° C. In embodiments in which the chalcopyrite particles include wurtzite particles, the reaction mixture may be subjected to a temperature of greater than approximately 120° C. to form a plurality of the chalcopyrite particles in the wurtzite phase.

The ratio of chalcopyrite particles in the chalcopyrite phase to chalcopyrite particles in the wurtzite phase may, alternatively, be controlled by an amount of the thiol reactant added to the reaction mixture. For example, to form ternary $CuIn_xGa_{1-x}S_2$ particles in the wurtzite phase (where $0 \leq x \geq 1$) the thiol acid (e.g., 3-mercaptopropionic acid) may be combined with the solution of the SSP dissolved in the solvent to form the reaction mixture, and the reaction mixture may be exposed to microwave radiation at a temperature of between approximately 120° C. and approximately 300° C. The quaternary $CuIn_xGa_{1-x}S_2$ particles may be formed in the chalcopyrite phase by adding 1,2-ethanedithiol to the reaction mixture. For example, one molar equivalent of 1,2-ethanedithiol may be added to the reaction mixture including 3-mercaptopropionic acid, the single source precursors and the solvent to form the quaternary $CuIn_xGa_{1-x}S_2$ particles in the wurtzite phase. Increasing the amount of the 1,2-ethanedithiol in the reaction mixture may result in increased formation of chalcopyrite particles in the chalcopyrite phase. In this way, the thiol reactant may be controlled to form the desired ratio of chalcopyrite particles in the chalcopyrite phase to chalcopyrite particles in the wurtzite phase.

Figure 1:
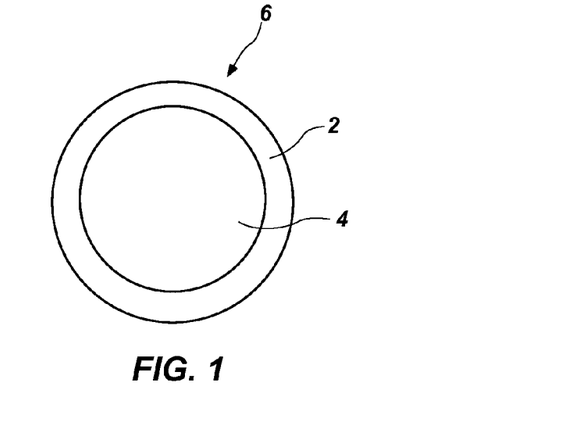
FIGS. 1-3 are schematic illustrations of cross-sectional views of hybrid particles according to embodiments of the disclosure.
Figure 2:
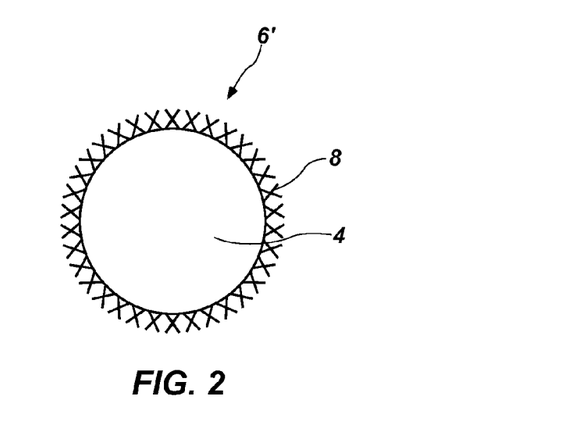
Figure 3:
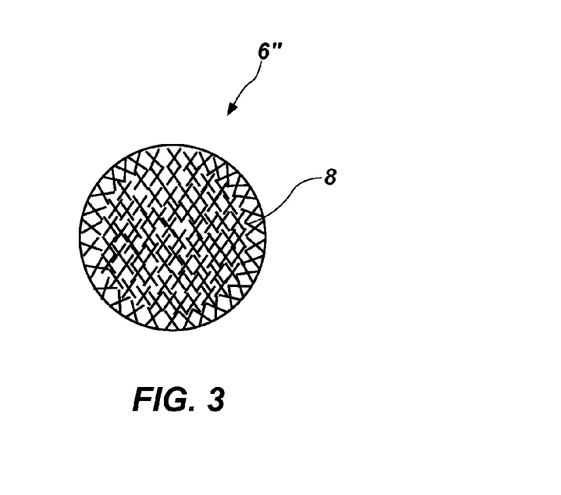

To form the hybrid particles from the chalcopyrite particles, at least one coating 2 may be formed on the chalcopyrite particles 4, producing hybrid particles 6, as shown in FIG. 1. Alternatively, a surface of or substantially all of the chalcopyrite particles 4 may be functionalized by conducting additional acts on the chalcopyrite particles 4, as shown in FIGS. 2 and 3, to form the hybrid particles 6', 6", respectively. A functionalized material is indicated in FIGS. 2 and 3 by reference numeral 8. The chalcopyrite particles 4 may be formed from at least one SSP as described in one or more of the above-referenced patents or patent applications. The chalcopyrite particles 4 may then be converted into the hybrid particles 6, 6', 6", as described in more detail below. The resulting hybrid particles 6, 6', 6" may have an average particle size (e.g., an average diameter) of less than or equal to 800 nm, such as less than or equal to approximately one hundred nanometers (100 nm). The particle size may be less than or equal to approximately 15 nm, such as approximately 5 nm. The hybrid particles 6, 6', 6" may be produced in a batch or continuous process.

The at least one coating 2 may be formed from an organic material, such as a polymer, an inorganic material, such as a metal or semiconductive material, or combinations thereof. The material of the coating 2 may be a different material than the chalcopyrite material. The polymer may be polystyrene or other similar polymer. The metal may be a transition metal, a Group 1 metal, a Group 2 metal, or an alloy thereof. By way of example, the metal may include gold. By way of example, the hybrid particles 6 may include at least one coating 2 of metal over the chalcopyrite particles 4. The coating 2 may be formed by contacting the chalcopyrite particles 4 with an SSP containing gold to coat an outer surface of the chalcopyrite particles 4. The SSP may be a molecule or complex as previously described. The chalcopyrite particles 4 having the SSP thereon may be subjected to a fluid, such as a supercritical fluid, to decompose the SSP on the outer surface and form the coating 2 of metal over the chalcopyrite particles 4. The supercritical fluid may include, but is not limited to, ammonia, sulfur hexafluoride ($SF_6$), carbon dioxide ($CO_2$), water, an alkane, an alkene, a ketone, an alcohol, a fluorocarbon, a perfluorocarbon, or a chlorofluorocarbon. Thus, the hybrid particles 6 may include the at least one coating 2 surrounding the chalcopyrite particles 4.

By adjusting the number of coatings 2 formed over the chalcopyrite particles 4, the size of the resulting hybrid particles 6 may be tailored. The hybrid particles 6 may also include a passivated surface compared to the chalcopyrite particles 4. While the formation of one coating 2 on the chalcopyrite particles 4 is described and illustrated, additional coatings may be formed by repeating the above-mentioned acts. The coating 2 or plurality of coatings may each be formed to a desired thickness. By way of example, the coating 2 may have a thickness less than approximately 50% of the diameter of the chalcopyrite particles 4. After forming the at least one coating 2, the hybrid particles 6 may, optionally, be subjected to additional processing or treatments to tailor the properties of the hybrid particles 6. By way of example, the hybrid particles 6 may be subjected to a gas, such as hydrogen ($H_2$), hydrogen sulfide ($H_2S$), or oxygen ($O_2$), to further modify or functionalize the hybrid particles 6. Alternatively, the hybrid particles 6 may be subjected to a thermal treatment, such as annealing, sintering, calcining, or drying, to modify the surface of the hybrid particles 6. By adjusting the number of coatings 2 applied to the chalcopyrite particles 4 and the optional processing or treatments, the hybrid particles 6 may be tailored to exhibit desired properties.

In one embodiment, a gold coating is formed on the chalcopyrite particles 4, producing hybrid particles 6 that may be configured to bypass the immune system of a mammalian patient and migrate to cancer tissue. In another embodiment, a magnetic coating, such as an iron coating, is formed on the chalcopyrite particles 4, producing hybrid particles 6 that may be easily separated from non-magnetic materials or non-magnetic particles. In yet another embodiment, a coating of a fluorescent material is formed on the chalcopyrite particles 4, producing hybrid particles 6 that may be easily separated from non-fluorescing materials or non-fluorescing particles. In yet still another embodiment, a coating of a polymer material, such as polystyrene, is formed on the chalcopyrite particles 4, producing hybrid particles 6 that may be used as capacitors.

To form hybrid particles 6', 6", the chalcopyrite particles 4 may be subjected to an additional act or acts, such as a chemical act or physical act. The additional act may be conducted on a surface of the chalcopyrite particles 4 to form the hybrid particles 6' having a functionalized surface in comparison to the chalcopyrite particles 4. Thus, the hybrid particles 6' may be a so-called "core-shell" material in which a core of the chalcopyrite material is surrounded by a shell of functionalized chalcopyrite material. Alternatively, the additional act may be conducted on the chalcopyrite particles 4 such that substantially all of the chalcopyrite material of the chalcopyrite particles 4 is functionalized, forming hybrid particles 6". The physical or chemical acts may also change the size of the chalcopyrite particles 4, passivate the surface of the chalcopyrite particles 4, or form a passivating coating on the chalcopyrite particles 4. Thus, the hybrid particles 6', 6" may differ from the chalcopyrite particles 4 in their surface chemistry or functionalization, or in the chemistry or functionalization throughout the hybrid particles 6', 6". Depending on the reaction conditions used, such as the reaction temperature and reaction time, the hybrid particles 6', 6" may be core-shell materials, inhomogeneous materials, or homogeneous materials.

The additional acts may include exposure of the chalcopyrite particles 4 to at least one of a reagent, heat, and a photolytic treatment (i.e., radiation). For example, the chemical reagent may be selected to perform a reduction/oxidation reaction, a hydrogenation reaction, a selenization reaction, or a nitration reaction with the chalcopyrite particles 4. By way of example, the chalcopyrite particles 4 may be subjected to a reactive fluid stream, such as a $H_2$ stream, a $H_2S$ stream, or an $O_2$ stream, to produce hybrid particles 6', 6" that are at least partially hydrogenated, at least partially selenized, or at least partially oxidized relative to the chalcopyrite particles 4. The hybrid particles 6', 6" may be partially or substantially fully hydrogenated, partially or substantially fully selenized, or partially or substantially fully oxidized. Alternatively, the chalcopyrite particles 4 may be reacted with a reduction/oxidation (redox) agent, such as selenic acid or another acidic selenium compound. The chalcopyrite particles 4 may also be subjected to heat, such as an annealing, sintering, calcining, or drying process to form the hybrid particles 6', 6". The chalcopyrite particles 4 may also be subjected to radiation, such as to a laser, ultrasonic, or radiowave/microwave radiation. The radiation may initiate a chemical reaction that changes the crystal structure, size, or chemical composition of the chalcopyrite particles 4. The chalcopyrite particles 4 may also be reacted with reagents that function as a source of a particular functional group, such as an amine, alcohol, carboxylic acid, thiol, phosphine, selenol, disulfide, diselenide, or halide functional group. The functional group may react with the chalcopyrite material of the chalcopyrite particles 4, producing hybrid particles 6', 6" with the functional group bonded to a surface of the chalcopyrite particles 4 or with the functional group bonded to the chalcopyrite material throughout the chalcopyrite particles 4, respectively. By adjusting the reaction conditions, such as the reaction temperature and reaction time, the hybrid particles 6', 6" may be produced. By way of example, the hybrid particles 6" in which the functional group is bonded to the chalcopyrite material throughout the chalcopyrite particles 4 may be produced by increasing the reaction temperature and reaction time relative to that used to produce the hybrid particles 6'.

Due to the coating 2 or the functionalized chalcopyrite material, the hybrid particles 6, 6', 6" may have different properties compared to the properties of the chalcopyrite particles 4, such as different photochemical, electrical, optical, thermal, conductivity, lubricity, solubility, or hardness properties. By way of example, the hybrid particles 6, 6', 6" may have a different solubility in water or other solvent than the chalcopyrite particles 4. Due to the difference in properties, the hybrid particles 6, 6', 6" may be in a more usable or useful form than the chalcopyrite particles 4.

The hybrid particles 6, 6', 6" may be formed from chalcopyrite particles 4 having the empirical formula $NME_2$ or $NME_2R$, where N, M, E, and R are as previously described, by reacting the chalcopyrite particles 4 with a reagent having the empirical formula REH, REER, RER, HEREH, or HERL, where R and E are as previously described and the other components are as described below. The hybrid particles 6, 6', 6" may be formed by reacting the chalcopyrite particles 4 with the reagent at a temperature of between approximately −20° C. and approximately 700° C., such as between approximately 60° C. and approximately 360° C. The chalcopyrite particles 4 and the reagent may be reacted for between approximately 1 minute and approximately 336 hours to form the hybrid particles 6, 6', 6".

In one embodiment, the hybrid particles 6, 6', 6" are formed by reacting chalcopyrite particles 4 having the empirical formula $NME_2$ or $NME_2R$, where N, M, E, and R are as previously described, with a reagent having the formula REH, where R and E are as previously described and H is hydrogen, indicating that a protonated form of the reagent is used. The resulting hybrid particles 6, 6', 6" have the empirical formula $NME_2(RR)$, where N, M, E, and R are as previously described. Each R may be the same or different, and each E may be the same or different. By way of example, the reagent having the empirical formula REH may be phenylselenol, ethaneselenol, N-acetyl-L-cysteine, thioacetic acid, thiobenzoic acid, or combinations thereof.

In another embodiment, the hybrid particles 6, 6', 6" are formed by reacting chalcopyrite particles 4 having the empirical formula $NME_2$ or $NME_2R$, where N, M, E, and R are as previously described, with a reagent having the formula REER, where R and E are as previously described. The resulting hybrid particles 6, 6', 6" have the empirical formula $NME_2(RR)$, where N, M, E, and R are as previously described. Each R may be the same or different, and each E may be the same or different. By way of example, the reagent having the formula REER may be dimethyldiselenide, diethyldiselenide, diphenyldiselenide, dibenzyldiselenide, seleno-L-cysteine, cystamine dihydrochloride, or combinations thereof.

In another embodiment, the hybrid particles 6, 6', 6" are formed by reacting chalcopyrite particles 4 having the empirical formula $NME_2$ or $NME_2R$, where N, M, E, and R are as previously described, with a reagent having the formula RER, where R and E are as previously described. The resulting hybrid particles 6, 6', 6" have the empirical formula $NME_2(RR)$, where N, M, E, and R are as previously described. Each R may be the same or different, and each E may be the same or different. By way of example, the reagent having the formula RER may be dimethylselenide, diphenylselenide, diethylselenide, or combinations thereof.

In another embodiment, polymeric hybrid particles 6, 6', 6" are formed by reacting chalcopyrite particles 4 having the empirical formula $NME_2$ or $NME_2R$, where N, M, E, and R are as previously described, with a reagent having the formula HEREH, where E, R, and H are as previously described. The resulting polymeric hybrid particles 6, 6', 6" have the empirical formula $[NME_2RE]_m$, where N, M, E, and R are as previously described and m is an integer greater than or equal to 1, such as from 1 to 1,000,000,000. Each R may be the same or different, and each E may be the same or different. By way of example, the reagent having the formula HEREH may be p-terphenyl-4,4"-dithiol, 1,4-bis(4-mercaptophenyl)benzene (TPDT), 4,4'-dimercaptostilbene, biphenyl-4,4'-dithiol, 1,4-benzenedimethanethiol, polyethylene glycol dithiol, 2-mercaptoethyl ether, 2,2'-(ethylenedioxy)diethanethiol, benzene-1,2-dithiol, benzene-1,3-dithiol, benzene-1,4-dithiol, 1,2,4-thiadiazole-3,5-dithiol, 1,3,4-thiadiazole-2,5-dithiol, 2,6-dithiopurine, M-carborane-1,7-dithiol, 4-phenyl-4H-(1,2,4) triazole-3,5-dithiol, DL-dithiothreitol, mercaptoacetic acid calcium salt, 1,2-ethanediselenol, 1,2-ethanedithiol, 1,3-propanedithiol, 1,4-butanedithiol, 1,5-pentanedithiol, 1,6-hexanedithiol, 1,8-octanedithiol, 1,9-nonanedithiol, α,ω-dithiol, resorcinarene cavitand, or combinations thereof.

In another embodiment, the hybrid particles 6, 6', 6" are formed by reacting the particles having the empirical formula $NME_2$ or $NME_2R$, where N, M, E, and R are as previously described, with a reagent having the formula HERL, where R, E, and H are as previously described, and L is a carboxylic acid group (—COOH), a hydroxyl group (—OH), or an amine group (—$NH_2$). The resulting hybrid particles 6, 6', 6" have the empirical formula $NME_2RL$, where N, M, E, R, and L are as previously described. Each E may be the same or different. By way of example, the reagent having the formula HERL may be thioglycolic acid, 3-mercaptopropionic acid, 2-mercaptoethanol, thiolactic acid, 3-mercapto-1,2-propanediol, mercaptosuccinic acid, O-[2-(3-mercaptopropionylamino)ethyl]-O'-methylpolyethylene glycol, 4-mercaptophenol, 4-mercaptobenzoic acid, 4-aminothiophenol, cysteamine hydrochloride, 11-mercaptoundecanoic acid, cysteaminedimethylselenide, or combinations thereof.

The hybrid particles 6, 6', 6" may be formed into a semiconductor material or thin film, which is used in a semiconductor device. By way of example, the semiconductor device may be a photovoltaic device (e.g., a thin-film solar cell), a diode (e.g., a light emitting diode (LED)), a radiation sensor, a solid state laser device, a vertical cavity surface emitting laser (VCSEL), or an integrated circuit (e.g., a memory module or microprocessor) that includes one or more layers of the semiconductor material. In one embodiment, the semiconductor device is an LED. The hybrid particles 6, 6', 6" may be formed into the semiconductor material by conventional techniques or techniques described in one or more of the above-referenced patents or patent applications. The hybrid particles 6, 6', 6" may also be used in magnetic memory, capacitors, photoradiation detection, optical coatings, catalytic materials, battery materials, thermoelectric materials, thermoconducting materials, or lubricity materials. The hybrid particles 6, 6', 6" may also have use in medical applications, such as in the migration or delivery of a pharmaceutical agent to tumors.

The hybrid particles 6, 6', 6" may be formed in a wurtzite phase, a chalcopyrite phase, or a combination thereof. The phase of the hybrid particles 6, 6', 6" may be the same as the phase of the chalcopyrite particles 4, or the phase of the hybrid particles 6, 6', 6" may be different from the phase of the chalcopyrite particles 4. The ratio of chalcopyrite particles 4 in the chalcopyrite phase to chalcopyrite particles 4 in the wurtzite phase may be controlled as described above. To control the ratio of hybrid particles 6, 6', 6" in the chalcopyrite phase to hybrid particles 6, 6', 6" in the wurtzite phase, the reaction conditions to which the chalcopyrite particles 4 are subjected may be adjusted to form a desired ratio of wurtzite particles to chalcopyrite hybrid particles. Thus, by appropriately selecting the reaction conditions, the phase of the chalcopyrite particles 4 and the hybrid particles 6, 6', 6" may be determined.

The difference in crystal structure between the hybrid particles 6, 6', 6" in the wurtzite phase and in the chalcopyrite phase may provide different properties to a semiconductor material that includes a combination of wurtzite phase and chalcopyrite phase hybrid particles 6, 6', 6". The hybrid particles 6, 6', 6" in the wurtzite phase include substantially flat crystals of approximately 200 nm in width, whereas the hybrid particles 6, 6', 6" in the chalcopyrite phase include smaller crystals of from approximately 2 nm to approximately 7 nm in width. Due to the differences in shape and size, the hybrid particles 6, 6', 6" in the wurtzite phase produce high quality semiconductor materials with very few defects when coupled with "space filling" hybrid particles 6, 6', 6" in the chalcopyrite phase. In contrast, semiconductor materials formed from hybrid particles 6, 6', 6" in the wurtzite phase alone do not work as well, and semiconductor materials formed from hybrid particles 6, 6', 6" in the chalcopyrite phase alone may exhibit film defects. However, by using a combination of both phases in the right ratio or proportion, high quality semiconductor materials may be made. The ability to selectively make both phases of the hybrid particles 6, 6', 6" in the desired ratio with the right atomic stoichiometry enables an operable semiconductor device to be produced.

The following examples serve to explain embodiments of the disclosure in more detail. These examples are not to be construed as being exhaustive or exclusive as to the scope of this disclosure.

EXAMPLES

The hybrid particles described in Examples 1-5 were produced as a core-shell material or a material having a homogeneous composition, depending on the reaction conditions, such as the reaction temperature and reaction time. By increasing at least one of the reaction temperature and the reaction time, the reagents had increased time to penetrate the nanoparticles and form hybrid particles having a homogeneous composition. If reduced temperatures or reaction times are used, the hybrid particles were produced as a core-shell material.

Example 1

Synthesis of Hybrid Particles

One (1) molar equivalent of $CuInS_2$ nanoparticles of various sizes (0.5 nm-300 nm) (0.100 gram, 0.412 millimole) was added to five (5) milliliters (ml) of a high boiling point solvent, such as benzyl acetate ($C_6H_5CH_2COOCH_3$), to form a first solution or slurry, which was stirred. Various molar equivalents of phenylselenol (PhSeH) (from approximately 1 mol % to approximately 500 mol %) were added to the stirring solution and thermally heated to the desired reaction temperature (from approximately 70° C. to approximately 350° C.). The reagent and $CuInS_2$ nanoparticles were reacted for an amount of time ranging between approximately 30 minutes and approximately 72 hours. The resulting product was isolated by washing three times with a nonreactive solvent, such as methanol ($CH_3OH$), and the product dried in vacuo to provide $CuIn(S,Se)_2$ hybrid particles of various sizes (0.5 nm-500 nm) as a black powder.

Example 2

Synthesis of Hybrid Particles

One (1) molar equivalent of $CuIn_{0.7}Ga_{0.3}S_2$ nanoparticles of various sizes (0.5 nm-300 nm) (0.100 gram, 0.437 millimole) was added to five (5) milliliters (ml) of a high boiling point solvent, such as $C_6H_5CH_2COOCH_3$, to form a first solution or slurry, which was stirred. Various molar equivalents of diethyldiselenide (EtSeSeEt) (from approximately 1 mol % to approximately 500 mol %) were added to the stirring solution and thermally heated to the desired reaction temperature (from approximately 70° C. to approximately 350° C.). The reagent and $CuIn_{0.7}Ga_{0.3}S_2$ nanoparticles were reacted for an amount of time ranging between approximately 30 minutes and approximately 72 hours. The resulting product were isolated by washing three times with a nonreactive solvent, such as methanol ($CH_3OH$), and the product dried in vacuo to provide $CuIn_{0.7}Ga_{0.3}(S,Se)_2$ hybrid particles of various sizes (0.5 nm-500 nm) as a black powder.

Example 3

Synthesis of Hybrid Particles

One (1) molar equivalent of $CuGaS_2$ nanoparticles of various sizes (0.5 nm-300 nm) (0.100 gram, 0.507 millimole) was added to five (5) milliliters (ml) of a high boiling point solvent, such as $C_6H_5CH_2COOCH_3$, to form a first solution or slurry, which was stirred. Various molar equivalents of α,ω-dithiol ($HSR_3SH$) (from approximately 1 mol % to approximately 1,000,000 mol %) and selenization reagents, such as diethyldiselenide (from approximately 1 mol % to approximately 1,000,000 mol %) were added to the stirring solution and thermally heated to the desired reaction temperature (from approximately 70° C. to approximately 350° C.). The reagents and $CuGaS_2$ nanoparticles were reacted for an amount of time ranging between approximately 30 minutes and approximately 72 hours. The resulting product was isolated by washing three times with $CH_3OH$ and the product dried in vacuo to provide $CuGa(S,Se)_2$ hybrid particles of various sizes (0.5 nm-500 nm) as a black powder.

Example 4

Synthesis of Hybrid Particles

One (1) molar equivalent of $CuInS_2$ nanoparticles of various sizes (0.5 nm-300 nm) (0.100 gram, 0.412 millimole) was added to five (5) milliliters (ml) of a high boiling point solvent, such as $C_6H_5CH_2COOCH_3$, to form a first solution or slurry, which was stirred. Various molar equivalents of 3-mercaptopropionic acid ($HSCH_2CH_2COOH$) (from approximately 1 mol % to approximately 500 mol %) was added to the stirring solution and thermally heated to the desired reaction temperature (from approximately 70° C. to approximately 350° C.). The reagent and $CuInS_2$ nanoparticles were reacted for an amount of time ranging between approximately 30 minutes and approximately 72 hours. The resulting product was isolated by washing three times with $CH_3OH$ and the product dried in vacuo to provide $CuInS_2(SR/SCH_2CH_2COOH)_m$ hybrid particles of various sizes (0.5 nm-500 nm) as a black powder.

Example 5

Synthesis of Hybrid Particles

One molar equivalent of $(Ph_3P)_2Cu(\mu\text{-}SEt)_2In(SEt)_2$ (3.00 g, 3.18 mmol) was dissolved in twenty (20) milliliters (ml) of a high boiling point solvent, such as $C_6H_5CH_2COOCH_3$, to form a first solution, which was stirred. To this first solution, 1-dodecanethiol (5.10 ml, 21.54 mmol) was added and the reaction heated via microwave to 160° C. for 30 minutes with a 15 minute ramp time. 3-mercaptopropionic acid (7.50 mL, 86.40 mmol) was added to the resulting clear colored solution and the reaction heated to 100° C. via microwave for 5 minutes. The resulting precipitates were isolated by washing three times with CH$_3$OH and the product dried in vacuo to provide CuInS$_2$(S(CH$_2$)$_{11}$CH$_3$)$_m$(SCH$_2$CH$_2$COOH)$_n$ hybrid particles of various sizes (0.5 nm-500 nm) as an orange to red powder.

While the disclosure is susceptible to various modifications and alternative forms, specific embodiments have been shown by way of example in the drawings and have been described in detail herein. However, the disclosure is not intended to be limited to the particular forms disclosed. Rather, the disclosure encompasses all modifications, combinations, equivalents, and alternatives falling within the scope of the disclosure as defined by the following appended claims and their legal equivalents.

What is claimed is:

1. A hybrid particle, comprising:
a chalcopyrite material having an empirical formula of NME$_2$ or NME$_2$R, where N comprises at least one element in Group 11 of the periodic table, M comprises at least one element in Group 13 of the periodic table, each E is independently selected from the group consisting of oxygen, sulfur, selenium, tellurium, and polonium, and R is selected from the group consisting of an alkyl group, aryl group, vinyl group, (per)fluoro alkyl group, (per)fluoro aryl group, silane group, and carbamato group; and
a functionalized chalcopyrite material on the chalcopyrite material, the functionalized chalcopyrite material having an empirical formula of NME$_2$(RR), [NME$_2$RE]$_m$, or NME$_2$RL, wherein N comprises at least one element in Group 11 of the periodic table, M comprises at least one element in Group 13 of the periodic table, each E is independently selected from the group consisting of oxygen, sulfur, selenium, tellurium, and polonium, each R is independently selected from the group consisting of an alkyl group, aryl group, vinyl group, (per)fluoro alkyl group, (per)fluoro aryl group, silane group, and carbamato group, L comprises a carboxylic acid group, a hydroxyl group, or an amine group, and m is an integer between 1 and 100.

2. A hybrid particle, comprising:
a reaction product of a chalcopyrite material and a reagent selected from the group consisting of hydrogen, hydrogen sulfide, oxygen, selenic acid, phenylselenol, ethaneselenol, N-acetyl-L-cysteine, thioacetic acid, thiobenzoic acid, dimethyldiselenide, diethyldiselenide, diphenyldiselenide, dibenzyldiselenide, seleno-L-cysteine, cystamine dihydrochloride, dimethylselenide, diphenylselenide, diethylselenide, p-terphenyl-4,4"-dithiol, 1,4-bis(4-mercaptophenyl)benzene, 4,4'-dimercaptostilbene, biphenyl-4,4'-dithiol, 1,4-benzenedimethanethiol, polyethylene glycol dithiol, 2-mercaptoethyl ether, 2,2'-(ethylenedioxy)diethanethiol, benzene-1,2-dithiol, benzene-1,3-dithiol, benzene-1,4-dithiol, 1,2,4-thiadiazole-3,5-dithiol, 1,3,4-thiadiazole-2,5-dithiol, 2,6-dithiopurine, M-carborane-1,7-dithiol, 4-phenyl-4H-(1,2,4)triazole-3,5-dithiol, DL-dithiothreitol, mercaptoacetic acid calcium salt, 1,2-ethanediselenol, 1,2-ethanedithiol, 1,3-propanedithiol, 1,4-butanedithiol, 1,5-pentanedithiol, 1,6-hexanedithiol, 1,8-octanedithiol, 1,9-nonanedithiol, α,ω-dithiol, resorcinarene cavitand, thioglycolic acid, 3-mercaptopropionic acid, 2-mercaptoethanol, thiolactic acid, 3-mercapto-1,2-propanediol, mercaptosuccinic acid, O-[2-(3-mercaptopropionylamino)ethyl]-O'-methylpolyethylene glycol, 4-mercaptophenol, 4-mercaptobenzoic acid, 4-aminothiophenol, cysteamine hydrochloride, 11-mercaptoundecanoic acid, cysteaminedimethylselenide, and combinations thereof, the chalcopyrite material formed from a single source precursor of the chalcopyrite material.

3. The hybrid particle of claim 2, wherein the hybrid particle comprises a reaction product of CuInS$_2$, CuInSe$_2$, Cu(In, Ga)Se$_2$, CuGaSe$_2$, or AgInS$_2$ and a functional group comprising an alkyl group, aryl group, vinyl group, (per)fluoro alkyl group, (per)fluoro aryl group, silane group, or carbamato group of the reagent.

4. A method of forming hybrid particles, comprising:
forming chalcopyrite particles from a single source precursor of a chalcopyrite material, the chalcopyrite particles having an empirical formula of NME$_2$ or NME$_2$R, where N comprises at least one element in Group 11 of the periodic table, M comprises at least one element in Group 13 of the periodic table, each E is independently selected from the group consisting of oxygen, sulfur, selenium, tellurium, and polonium, and R comprises an alkyl group, aryl group, vinyl group, (per)fluoro alkyl group, (per)fluoro aryl group, silane group, or carbamato group; and
functionalizing the chalcopyrite particles to form hybrid particles having an empirical formula of NME$_2$(RR), [NME$_2$RE]$_m$, or NME$_2$RL, where N comprises at least one element in Group 11 of the periodic table, M comprises at least one element in Group 13 of the periodic table, each E is independently selected from the group consisting of oxygen, sulfur, selenium, tellurium, and polonium, R comprises an alkyl group, aryl group, vinyl group, (per)fluoro alkyl group, (per)fluoro aryl group, silane group, or carbamato group, m comprises an integer greater than or equal to 1, and L comprises a carboxylic acid group, a hydroxyl group, or an amine group.

5. The method of claim 4, wherein functionalizing the chalcopyrite particles comprises subjecting at least a surface of the chalcopyrite particles to at least one reagent selected from the group consisting of hydrogen (H$_2$), hydrogen sulfide (H$_2$S), oxygen (O$_2$), an acidic selenium compound, phenylselenol, ethaneselenol, N-acetyl-L-cysteine, thioacetic acid, thiobenzoic acid, dimethyldiselenide, diethyldiselenide, diphenyldiselenide, dibenzyldiselenide, seleno-L-cysteine, cystamine dihydrochloride, dimethylselenide, diphenylselenide, diethylselenide, p-terphenyl-4,4"-dithiol, 1,4-bis(4-mercaptophenyl)benzene, 4,4'-dimercaptostilbene, biphenyl-4,4'-dithiol, 1,4-benzenedimethanethiol, polyethylene glycol dithiol, 2-mercaptoethyl ether, 2,2'-(ethylenedioxy)diethanethiol, benzene-1,2-dithiol, benzene-1,3-dithiol, benzene-1,4-dithiol, 1,2,4-thiadiazole-3,5-dithiol, 1,3,4-thiadiazole-2,5-dithiol, 2,6-dithiopurine, M-carborane-1,7-dithiol, 4-phenyl-4H-(1,2,4)triazole-3,5-dithiol, DL-dithiothreitol, mercaptoacetic acid calcium salt, 1,2-ethanediselenol, 1,2-ethanedithiol, 1,3-propanedithiol, 1,4-butanedithiol, 1,5-pentanedithiol, 1,6-hexanedithiol, 1,8-octanedithiol, 1,9-nonanedithiol, α,ω-dithiol, resorcinarene cavitand, thioglycolic acid, 3-mercaptopropionic acid, 2-mercaptoethanol, thiolactic acid, 3-mercapto-1,2-propanediol, mercaptosuccinic acid, O-[2-(3-mercaptopropionylamino)ethyl]-O'-methylpolyethylene glycol, 4-mercaptophenol, 4-mercaptobenzoic acid, 4-aminothiophenol, cysteamine hydrochloride, 11-mercaptoundecanoic acid, and cysteaminedimethylselenide.

6. The method of claim 4, wherein functionalizing the chalcopyrite particles comprises forming hybrid particles comprising a functionalized chalcopyrite material on the chalcopyrite material.

7. The method of claim 4, wherein functionalizing the chalcopyrite particles comprises forming hybrid particles consisting essentially of a functionalized chalcopyrite material.

8. The method of claim 4, further comprising forming a combination of chalcopyrite phase hybrid particles and wurtzite phase hybrid particles.

9. The method of claim 4, wherein functionalizing the chalcopyrite particles to form hybrid particles having an empirical formula of $NME_2(RR)$, $[NME_2RE]_m$, or $NME_2RL$ comprises reacting the chalcopyrite particles with a reagent having the empirical formula REH to form the hybrid particles having the empirical formula $NME_2(RR)$.

10. The method of claim 4, wherein functionalizing the chalcopyrite particles to form hybrid particles having an empirical formula of $NME_2(RR)$, $[NME_2RE]_m$, or $NME_2RL$ comprises reacting the chalcopyrite particles with a reagent having the empirical formula REER to form hybrid particles having the empirical formula $NME_2(RR)$.

11. The method of claim 4, wherein functionalizing the chalcopyrite particles to form hybrid particles having an empirical formula of $NME_2(RR)$, $[NME_2RE]_m$, or $NME_2RL$ comprises reacting the chalcopyrite particles with a reagent having the empirical formula RER to form hybrid particles having the empirical formula $NME_2(RR)$.

12. The method of claim 4, wherein functionalizing the chalcopyrite particles to form hybrid particles having an empirical formula of $NME_2(RR)$, $[NME_2RE]_m$, or $NME_2RL$ comprises reacting the chalcopyrite particles with a reagent having the empirical formula HEREH to form hybrid particles having the empirical formula $[NME_2RE]_m$.

13. The method of claim 4, wherein functionalizing the chalcopyrite particles to form hybrid particles having an empirical formula of $NME_2(RR)$, $[NME_2RE]_m$, or $NME_2RL$ comprises reacting the chalcopyrite particles with a reagent having the empirical formula HERL to form hybrid particles having the empirical formula $NME_2RL$.

14. A method of forming hybrid particles, comprising:
    forming chalcopyrite particles from a single source precursor of a chalcopyrite material, the chalcopyrite particles having an empirical formula of $NME_2$, where N comprises copper, M comprises at least one of indium and gallium, and each E is independently selected from the group consisting of sulfur and selenium; and
    functionalizing the chalcopyrite particles to form $CuIn(S,Se)_2$ hybrid particles, $CuIn_{0.7}Ga_{0.3}(S,Se)_2$ hybrid particles, $CuGa(S,Se)_2$ hybrid particles, or $CuInS_2(SR/SCH_2CH_2COOH)_m$ hybrid particles, where R is an alkyl group, aryl group, vinyl group, (per)fluoro alkyl group, (per)fluoro aryl group, silane group, or carbamato group and m is an integer greater than or equal to 1.

15. The method of claim 14, wherein forming chalcopyrite particles from a single source precursor of a chalcopyrite material comprises forming the chalcopyrite particles from $CuInS_2$, $CuInSe_2$, $CuIn_{0.7}Ga_{0.3}S_2$, $Cu(In,Ga)Se_2$, $CuGaSe_2$, or $AgInS_2$.

16. The method of claim 14, wherein functionalizing the chalcopyrite particles to form $CuIn(S,Se)_2$ hybrid particles, $CuIn_{0.7}Ga_{0.3}(S,Se)_2$ hybrid particles, $CuGa(S,Se)_2$ hybrid particles, or $CuInS_2(SR/SCH_2CH_2COOH)_m$ hybrid particles comprises reacting $CuInS_2$ particles with phenylselenol to form the $CuIn(S,Se)_2$ hybrid particles.

17. The method of claim 14, wherein functionalizing the chalcopyrite particles to form $CuIn(S,Se)_2$ hybrid particles, $CuIn_{0.7}Ga_{0.3}(S,Se)_2$ hybrid particles, $CuGa(S,Se)_2$ hybrid particles, or $CuInS_2(SR/SCH_2CH_2COOH)_m$ hybrid particles comprises reacting $CuIn_{0.7}Ga_{0.3}S_2$ particles with diethyldiselenide to form the $CuIn_{0.7}Ga_{0.3}(S,Se)_2$ hybrid particles.

18. The method of claim 14, wherein functionalizing the chalcopyrite particles to form $CuIn(S,Se)_2$ hybrid particles, $CuIn_{0.7}Ga_{0.3}(S,Se)_2$ hybrid particles, $CuGa(S,Se)_2$ hybrid particles, or $CuInS_2(SR/SCH_2CH_2COOH)_m$ hybrid particles comprises reacting $CuGaS_2$ particles with $\alpha,\omega$-dithiol and diethyldiselenide to form the $CuGa(S,Se)_2$ hybrid particles.

19. The method of claim 14, wherein functionalizing the chalcopyrite particles to form $CuIn(S,Se)_2$ hybrid particles, $CuIn_{0.7}Ga_{0.3}(S,Se)_2$ hybrid particles, $CuGa(S,Se)_2$ hybrid particles, or $CuInS_2(SR/SCH_2CH_2COOH)_m$ hybrid particles comprises reacting $CuInS_2$ particles with 3-mercaptopropionic acid to form the $CuInS_2(SR/SCH_2CH_2COOH)_m$ hybrid particles.

* * * * *